United States Patent
Kawasaki et al.

(10) Patent No.: US 9,802,251 B2
(45) Date of Patent: Oct. 31, 2017

(54) NI BALL, NI CORE BALL, SOLDER JOINT, SOLDER PASTE, AND SOLDER FOAM

(71) Applicant: Senju Metal Industry Co., Ltd., Tokyo (JP)

(72) Inventors: Hiroyoshi Kawasaki, Tochigi (JP); Takashi Akagawa, Tochigi (JP); Yuichi Koikeda, Tochigi (JP); Atsushi Ikeda, Tochigi (JP); Masaru Sasaki, Tochigi (JP); Takahiro Roppongi, Tochigi (JP); Daisuke Soma, Tochigi (JP); Isamu Sato, Saitama (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 15/116,280

(22) PCT Filed: Feb. 4, 2014

(86) PCT No.: PCT/JP2014/052571
§ 371 (c)(1),
(2) Date: Dec. 5, 2016

(87) PCT Pub. No.: WO2015/118613
PCT Pub. Date: Aug. 13, 2015

(65) Prior Publication Data
US 2017/0080491 A1   Mar. 23, 2017

(51) Int. Cl.
*B22F 1/00* (2006.01)
*B22F 1/02* (2006.01)
(Continued)

(52) U.S. Cl.
CPC .............. *B22F 1/02* (2013.01); *B22F 1/0048* (2013.01); *B22F 1/0074* (2013.01);
(Continued)

(58) Field of Classification Search
None
See application file for complete search history.

(56) References Cited

U.S. PATENT DOCUMENTS 7,671,609 B2    3/2010  Sato
9,050,654 B2    6/2015  Asada
(Continued)

FOREIGN PATENT DOCUMENTS

JP    200293866 A    3/2002
JP    2003249598 A   9/2003
(Continued)

*Primary Examiner* — Daniel J Schleis
(74) *Attorney, Agent, or Firm* — The Webb Law Firm

(57) ABSTRACT

Provided are a Ni ball, a Ni core ball, a solder joint, solder paste and foamed solder which are superior in the impact resistance to dropping and can inhibit any occurrence of a poor joints. An electronic component 60 is constructed by joining a solder bump 30 of a semiconductor chip 10 to an electrode 41 of a printed circuit board 40 with solder paste 12, 42. The solder bump 30 is formed by joining an electrode 11 of the semiconductor chip 10 to the Ni ball 20. The Ni ball 20 according to the present invention contains purity which is equal to or higher than 99.9% and equal to or lower than 99.995%, sphericity which is equal to or higher than 0.90, and Vickers hardness which is equal to or higher than 20HV and equal to or less than 90HV.

16 Claims, 2 Drawing Sheets

(51) Int. Cl.
*B23K 35/22* (2006.01)
*C25D 7/00* (2006.01)
*C22C 19/03* (2006.01)
*C22F 1/00* (2006.01)
*C22F 1/10* (2006.01)
*B23K 35/30* (2006.01)
*B23K 35/02* (2006.01)

(52) U.S. Cl.
CPC ............ *B23K 35/025* (2013.01); *B23K 35/22* (2013.01); *B23K 35/3033* (2013.01); *C22C 19/03* (2013.01); *C22F 1/00* (2013.01); *C22F 1/10* (2013.01); *C25D 7/00* (2013.01); *B22F 2301/15* (2013.01); *B22F 2302/45* (2013.01)

(56) References Cited

U.S. PATENT DOCUMENTS

| | | | |
|---|---|---|---|
| 9,394,590 | B2 | 7/2016 | Kanou |
| 2014/0010705 | A1 | 1/2014 | Kanou |

FOREIGN PATENT DOCUMENTS

| | | | |
|---|---|---|---|
| JP | 2004315871 | A | 11/2004 |
| JP | 2005338072 | A | 12/2005 |
| JP | 2007115857 | A | 5/2007 |
| JP | 2010216004 | A | 9/2010 |
| JP | 2011214061 | A | 10/2011 |
| WO | 9524113 | A1 | 9/1995 |
| WO | 2011114824 | A1 | 9/2011 |
| WO | 2012120982 | A1 | 9/2012 |

[FIG. 1]
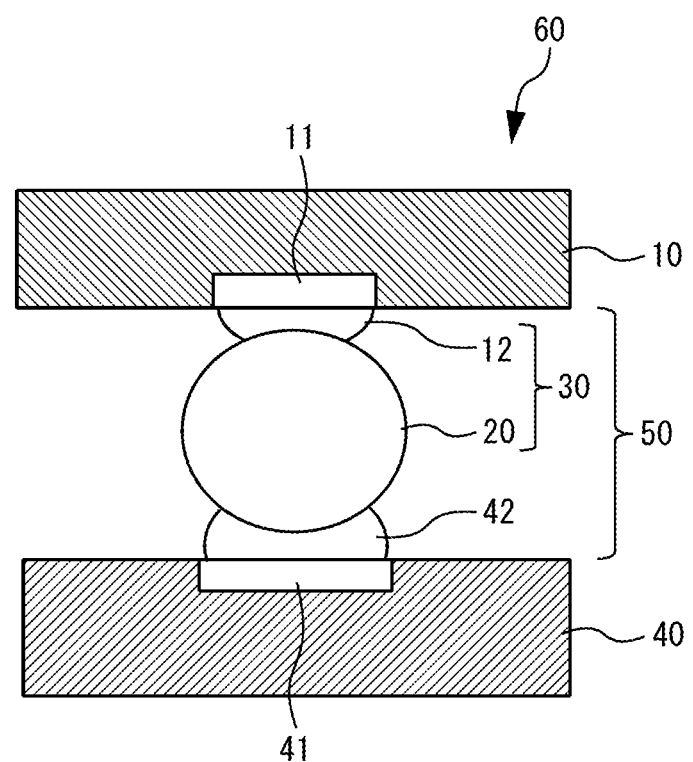

[FIG. 2]
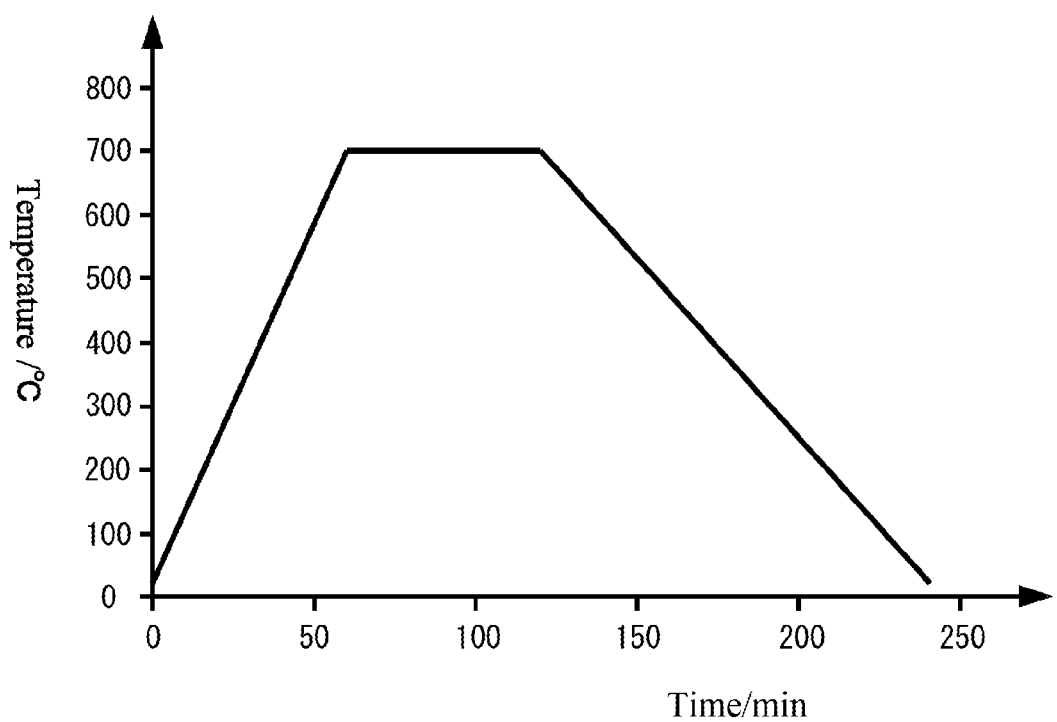

NI BALL, NI CORE BALL, SOLDER JOINT, SOLDER PASTE, AND SOLDER FOAM

CROSS-REFERENCE TO RELATED APPLICATION

This application is the United States national phase of International Application No. PCT/JP2014/052571 filed Feb. 4, 2014, the disclosure of which is hereby incorporated in its entirety by reference.

TECHNICAL FIELD

The present invention relates to a Ni ball, a Ni core ball, a solder joint, solder paste and foamed solder.

BACKGROUND

Recently, along development of compact information equipment, electronic components to be mounted have been downsized rapidly. A ball grid alley (hereinafter referred to as "BGA") having electrodes at its rear surface is applied to such electronic components in order to cope with a narrowed connection terminal and a reduced mounting area because of the downsizing requirement.

As the electronic components to which the BGA is applied, for example, a semiconductor package is exemplified. In the semiconductor package, semiconductor chips having electrodes are sealed with resin. Solder bumps are formed on the electrodes of the semiconductor chips. This solder bump is formed by joining a solder ball to an electrode of the semiconductor chip. The semiconductor package to which the BGA is applied is mounted on a printed circuit board by joining the solder bump melted by the heating to a conductive land of the printed circuit board. Additionally, a three-dimensional high-density mounting structure has been studied by stacking up the semiconductor packages in a height direction in order to meet the further high-density mounting requirement.

However, in a case that the BGA is applied to the semiconductor package for the three-dimensional high-density mounting structure, the solder ball may be crushed by semiconductor package's weight. If such an accident happens, an appropriate space between the substrates cannot be maintained.

Accordingly, a solder bump has been considered, where a Ni ball or a Ni core ball in which solder plating is covered on a surface of the Ni ball, is electrically joined on an electrode of an electronic component by using solder paste. The solder bump formed by using the Ni ball or the Ni core ball can support a semiconductor package by the Ni ball, which is not melted at a melting temperature of the solder, even if the solder bump receives the weight of the semiconductor package when the electronic components are mounted on the printed circuit board. Therefore, the solder bump is not crushed by the semiconductor package's weight. As related art, for example, Patent Document 1 is exemplified.

A Ni material is melted with the high temperature and liquid molten Ni is sprayed from a nozzle at high speed, and then misty molten Ni is rapidly cooled to a room temperature (25 degrees C., for example), and therefore a Ni ball is sphered. Patent Document 1 discloses a method of forming a Ni ball and the like by using a gas atomizing method, in which metal melt is put into a spray tank under a helium gas atmosphere from a nozzle installed in a bottom of a carbon melting pot, and then $H_2$/He-mixture gas is sprayed from a nozzle installed at a vicinity of a forward end of the carbon melting pot to atomizing the metal melt, thereby manufacturing ultrafine particles.

PRIOR ART DOCUMENTS

Patent Documents

Patent Document 1: Japanese Patent Application Publication No. 2004-315871

SUMMARY OF THE INVENTION

Problems to be Solved by the Invention

However, as mentioned above, in a case of manufacturing the Ni ball by the rapid-cooling, a crystal grain of Ni is formed instantly, so that the Ni ball is formed by a fine crystal grain before the crystal grain grows bigger. Because the Ni ball formed by the fine crystal grain is hard and high in the Vickers hardness, the durability against external stress becomes low and the problem that the impact resistance to dropping gets worse occurs. Therefore, for the Ni ball used for implementing a semiconductor chip, any definite softness is required, that is the Vickers hardness that is equal to a prescribed value or less is required.

In order to manufacture the Ni ball having such definite softness, the purity of Ni is increased as a usual practice. This is because a crystal grain grows bigger when the impurity elements which function as a crystal core inside the Ni ball decrease and as the result, the Vickers hardness of the Ni ball becomes lower. However, in a case that the purity of Ni ball is increased, a problem which sphericity of the Ni ball becomes lower occurs instead of enabling the Vickers hardness of the Ni ball to be lower.

In a case that the sphericity of Ni ball is low, there is a possibility that self-aligning property cannot be ensured when mounting the Ni balls on the electrodes, and simultaneously there is a possibility that poor joints are produced due to uneven heights of the Ni balls at the time of mounting a semiconductor chip. In the above-mentioned Patent Document 1, the method of manufacturing the Ni ball is disclosed, however, there is not any description of the Ni ball in which the properties of both the Vickers hardness and the sphericity are considered.

Accordingly, in order to solve the above-described problems, the present invention has a purpose to provide a Ni ball, a Ni core ball, a solder joint, solder paste and foamed solder, which are superior in the impact resistance to dropping and can inhibit any occurrence of a poor joints or the like.

Means for Solving the Problems

The inventors of the present invention have conducted a selection of the Ni ball. They have found out that the Ni ball, which is preferable for the solution of problems in the present invention, could be obtained when the Vickers hardness of the Ni ball is equal to or higher than 20HV and equal to or less than 90HV. Moreover, it has been found that Ni balls having Vickers hardness ranged from equal to or higher than 20HV to equal to or less than 90HV could be obtained efficiently by expediting crystal growth in each of the Ni balls and therefore, mass production could be realized. Furthermore, in the present invention, a case of utilizing 'an annealing treatment' will be described as means for expediting the crystal growth of each of the Ni balls.

However, the annealing treatment is not always a necessary step and the crystal growth of each of the Ni balls can be expedited by utilizing other means.

Here, the present invention is described as follows.

(1) A Ni ball containing purity which is equal to or higher than 99.9% and equal to or lower than 99.995%, sphericity which is equal to or higher than 0.90, and Vickers hardness which is equal to or higher than 20HV and equal to or less than 90HV.

(2) The Ni ball according to the above-mentioned item (1), wherein a content of U is equal to or less than 5 ppb, a content of Th is equal to or less than 5 ppb, a total content of at least one of Pb and Bi is equal to or more than 1 ppm, and an alpha dose is equal to or less than 0.0200 cph/cm$^2$.

(3) The Ni ball according to the above-mentioned item (1) or (2), wherein a diameter thereof is 1-1000 μm.

(4) The Ni ball according to any one of the above-mentioned items (1) through (3) wherein the Ni ball is coated with a flux layer.

(5) A Ni core ball containing the Ni ball according to any one of the above-mentioned items (1) through (3) and a solder layer coating the Ni ball.

(6) A Ni core ball containing the Ni ball according to any one of the above-mentioned items (1) through (3) and a plating layer which includes at least one element selected from a group of Ni, Fe and Co, the plating layer coating the Ni ball.

(7) The Ni core ball according to the above-mentioned item (6), further comprises a solder layer which coats the plating layer.

(8) The Ni core ball according to the above-mentioned items (5) through (7) wherein sphericity thereof is equal to or higher than 0.90.

(9) The Ni core ball according to any one of the above-mentioned items (5) through (7), wherein in the solder layer coating the plating layer, a content of U is equal to or less than 5 ppb; a content of Th is equal to or less than 5 ppb; a total content of at least one of Pb and Bi is equal to or more than 1 ppm; and an alpha dose is equal to or less than 0.0200 cph/cm$^2$.

(10) The Ni core ball according to any one of the above-mentioned items (5) through (9) wherein the Ni core ball is coated with a flux layer.

(11) A solder joint using the Ni ball according to any one of the above-mentioned items (1) through (4).

(12) Solder paste using the Ni ball according to any one of the above-mentioned items (1) through (4).

(13) Foamed solder using the Ni ball according to any one of the above-mentioned items (1) through (4).

(14) A solder joint using the Ni core ball according to any one of the above-mentioned items (5) through (10).

(15) Solder paste using the Ni core ball according to any one of the above-mentioned items (5) through (10).

(16) Foamed solder using the Ni core ball according to any one of the above-mentioned items (5) through (10).

Effects of the Invention

According to the present invention, since the Vickers hardness of the Ni ball is set to be equal to or higher than 20HV and equal to or lower than 90HV, it is possible to improve the impact resistance to dropping and simultaneously, it is possible to maintain an appropriate space between the substrates. Additionally, since the sphericity of the Ni ball is set to be equal to or higher than 0.90, it is possible to ensure the self-alignment property when mounting the Ni balls on the electrodes, and simultaneously, it is possible to inhibit uneven heights of the Ni balls.

BRIEF DESCRIPTION OF THE DRAWINGS

FIG. 1 is a diagram of an electronic component using a Ni ball according to the prevent invention for illustrating a configuration example thereof.

FIG. 2 is a diagram showing a relationship between temperature and time at the time of annealing.

EMBODIMENTS FOR CARRYING OUT THE INVENTION

The present invention will be described in detail hereinafter. In this specification, units (such as ppm, ppb and %) relating to composition of the Ni ball represent ratios to mass of the Ni ball (mass ppm, mass ppb and mass %) unless otherwise specified.

FIG. 1 shows a configuration example of an electronic component 60 in which a semiconductor chip 10 is mounted on a printed circuit board 40 using a Ni ball 20 according to the prevent invention. As shown in FIG. 1, the Ni ball 20 is mounted on an electrode 11 of the semiconductor chip 10 via solder paste 12. In this example, a structure in which the Ni ball 20 is mounted on the electrode 11 of the semiconductor chip 10 is called a solder bump 30. Solder paste 42 is printed on an electrode 41 of the printed circuit board 40. The solder bump 30 of the semiconductor chip 10 is connected on the electrode 41 of the printed circuit board 40 via the solder paste 42. In this embodiment, a structure in which the solder bump 30 is mounted on the electrode 41 of the printed circuit board 40 is called a solder joint 50.

The Ni ball 20 according to the present invention is characterized in that its purity is equal to or higher than 99.9% and equal to or lower than 99.995%, its sphericity is equal to or higher than 0.90, and its Vickers hardness is equal to or higher than 20HV and equal to or less than 90HV. In this way, impact resistance to dropping can be improved by setting the Vickers hardness of the Ni ball to be equal to or less than 90HV, and an appropriate space between the substrates can be maintained by setting the Vickers hardness of the Ni ball to be equal to or higher than 20HV. Additionally, by setting the sphericity of the Ni ball 20 to be equal to or higher than 0.90, the self-alignment property can be ensured when mounting the Ni balls 20 on the electrodes 11 of the semiconductor chip 10, and simultaneously, uneven heights of the solder joints 50 can be inhibited because the Ni ball 20 is not melted at a melting temperature in the soldering. In this way, the poor joints of the semiconductor chip 10 and the printed circuit board 40 can be securely prevented. A preferred embodiment of the Ni ball 20 will be described hereinafter.

<The Vickers Hardness: Equal to or Higher than 20HV and Equal to or Less than 90HV>

The Vickers hardness of the Ni ball according to the present invention is preferably equal to or less than 90HV. This is because the durability against external stress becomes low, the impact resistance to dropping gets worse, and cracks are generated easily, in a case that the Vickers hardness exceeds 90HV. This is also because, in a case that the auxiliary force such as pressurization is applied when forming three-dimensional mounting bumps and joints, there is a possibility that a crash of electrode and the like may occur with the use of a hard Ni ball. Moreover, this is because, in a case that the Vickers hardness of Ni ball 20 exceeds 90HV, a crystal grain becomes smaller than a certain size and therefore, a deterioration of electrical conductivity may be caused. In the present embodiment, after manufacturing the Ni ball by productive rapid-cooling, the crystal growth is expedited in the manufactured Ni ball 20, and therefore the Ni ball 20 whose Vickers hardness is equal to or less than 90HV is manufactured. As means for expediting the crystal growth in the Ni ball 20, for example, it is exemplified that a step for slow-cooling, not the conventional rapid-cooling, at the time of making the Ni ball 20, is set, except the annealing treatment. When an apparatus of drip type is used as a manufacturing apparatus of the Ni balls 20, an extremely high tower is needed for the slow-cooling, which lacks feasibility. However, if a method for manufacturing them by a heating furnace type is used, it is possible to cope with the slow-cooling by adding a slow-cooling process that makes a cooling speed slower or sets a conveying distance longer.

Moreover, the Vickers hardness of the Ni ball according to the present invention needs to be at least a value larger than 10-20HV of the Vickers hardness of the solder ball, and preferably 20HV or more. When the Vickers hardness of the Ni ball is less than 20HV, the Ni ball becomes deformed (crashed) due to its own weight of the semiconductor chips or the like in the three-dimensional mounting, so that it is impossible to maintain an appropriate space between the substrates (stand-off height). Additionally, because no plating step is required like Ni pillar and the like, a pitch narrowing for the electrode 41 and the like can be realized by setting the Vickers hardness of the Ni ball 20 at 20HV and more.

<Content of U: Equal to or Less than 5 Ppb, and Content of Th: Equal to or Less than 5 ppb>

U and Th are radioactive elements and it is required to reduce the content of these elements in order to suppress a soft error. The content of each U and Th should be equal to or less than 5 ppb in order to make an alpha dose of the Ni ball 20 equal to or less than 0.0200 cph/cm$^2$. In addition, from a viewpoint of the suppression of the soft error for the current or future high-density mounting, the content of each U and Th should be equal to or less than 2 ppb.

<Purity in Ni Ball: Equal to or Higher than 99.9% and Equal to or Lower than 99.995%>

It is preferable that purity in the Ni ball 20 constituting the present invention is equal to or higher than 99.9% and equal to or lower than 99.995%. If the purity in the Ni ball 20 is within this range, a sufficient volume of crystal cores for increasing the sphericity of the Ni ball 20 can be kept in molten Cu. The following will describe a reason why sphericity is increased hereinafter.

When manufacturing the Ni ball 20, the Ni material is formed into a predetermined shaped chip and is melted by heating. The molten Ni then becomes a spherical form with its surface tension. It is solidified to become the Ni ball 20. At a process of solidifying the molten Ni from its liquid state, a crystal grain grows up in the molten Ni of the spherical form. In this process, if there are a lot of impurity elements, they become the crystal cores and prevent the crystal grain from growing. Accordingly, the molten Ni of the spherical form becomes the Ni ball 20 having the high sphericity with the fine crystal grains that is prevented from growing up. On the other hand, if the number of impurity elements is less, then the crystal cores are relatively less formed. They grow up in a directional property without suppressing the grain growth. As a result, a part of the surface of the molten Ni with the spherical form protrudes and solidifies. The sphericity of such a Ni ball 20 is low. It is conceivable that the impurity elements may be Sb, Cu, Bi, Zn, Fe, Al, As, Cd, Sn, Pb, Ag, In, Au, P, S, Mg, Ti, Co, Mn, U, Th, etc.

Although a lower limit value of the purity is not limited: It is preferably equal to or higher than 99.9% from the viewpoints such that the alpha dose is suppressed and the degradation of the electrical conductivity and thermal conductivity of the Ni ball 20 based on the reduced purity is suppressed.

Here, in the Ni ball 20, its alpha dose can be reduced without increasing its purity beyond necessity. The melting point of Ni is higher than that of Sn and the heating temperature of Ni is higher than that of Sn during the manufacturing. In the present invention, since a heating treatment, which has not been conventionally performed on the Ni material, is performed for manufacturing the Ni ball 20, as will become apparent below, radioactive elements such as $^{210}$Po, $^{210}$Pb, $^{210}$Bi, etc. volatilize. $^{210}$Po is especially easy to volatilize among these radioactive elements.

<Alpha Dose: Equal to or Less than 0.0200 cph/cm$^2$>

The alpha dose of the Ni ball 20 according to the present invention is equal to or less than 0.0200 cph/cm$^2$, preferably equal to or less than 0.0020 cph/cm$^2$, and more preferably equal to or less than 0.0010 cph/cm$^2$. This is such an alpha dose that it is insignificant for any soft errors in the high-density mounting of the electronic components. Conventionally, it has been considered that alpha dose of Ni does not cause any soft errors because a Ni ball is manufactured by melting Ni material with the heat of 1500 degrees C. or more, and the content of radioactive elements such as $^{210}$Po, which emits the alpha ray, is sufficiently reduced by volatilization. However, it has not been proved that the alpha dose of the Ni ball is reduced to the extent where any soft errors do not occur, by the conventional manufacture conditions of the Ni ball. The boiling point of $^{210}$Po is 962 degrees C., and therefore it is conceivable that sufficient volatilization is done by the heating with the temperature of 1500 degrees C. or more to the extent where any soft errors do not occur. However, $^{210}$Po is not always reduced sufficiently with this temperature, since the heating at the time of manufacturing the Ni ball is not intended to volatilize $^{210}$Po. It is not certain whether or not the Ni ball with low alpha dose can be obtained by the conventional manufacture of Ni ball.

In the present invention, a reheating treatment is performed in addition to usual steps for manufacturing a Ni ball 20. Thus, a slight amount of $^{210}$Po remained in Ni raw material volatilizes and in comparison with the Ni raw material, the Ni ball 20 shows further lower alpha dose. The alpha dose is preferably equal to or less than 0.0020 cph/cm, and more preferably equal to or less than 0.0010 cph/cm2 from the viewpoints of suppressing the soft error in the further high-density mounting. In addition, the alpha dose of the Ni ball 20 does not rise by setting up the annealing treatment that lessens the Vickers hardness of the Ni ball 20, or the slow-cooling process.

<Total Content of at Least One of Pb and Bi that is Equal to or more than 1 ppm>

The Ni ball 20 constituting the present invention contains Sb, Cu, Bi, Zn, Fe, Al, As, Cd, Sn, Pb, Ag, In, Au, P, S, Mg, Ti, Co, Mn, U, Th, etc. as impurity elements, however, especially the total content of either Pb or Bi, otherwise the total content of Pb and Bi is preferably equal to or more than 1 ppm. In the present invention, even in a case that the Ni ball 20 is exposed when forming a solder joint, it is unnecessary that a content of at least one of Pb or Bi contained in the Ni ball 20 is reduced to the utmost limit in reducing the alpha dose. This is because of the following reasons.

$^{210}$Pb and $^{210}$Bi change to $^{210}$PO through beta decay. It is preferable that the content of Pb and Bi as the impurity elements is as small as possible in order to reduce the alpha dose.

However, the content ratio of $^{210}$Pb and $^{210}$Bi contained in Pb and Bi is low. It is conceivable that each of $^{210}$Bp and $^{210}$Bi is almost removed if the content of Pb and Bi is reduced to some extent. The Ni ball 20 according to the present invention is manufactured by either setting a melting temperature of Ni slightly higher than heretofore, or conducting a heating treatment on the Ni material and/or the sphered Ni ball 20. In this temperature, vaporization occurs even when the temperature is lower than the boiling point of Pb or Bi, and therefore the amount of the impurity elements is decreased. Moreover, it is better to increase the content of the impurity elements in order to improve the sphericity of the Ni ball 20. Therefore, for the Ni ball 20 according to the present invention, the total content of at least one of Pb and Bi is equal to or more than 1 ppm. In a case of containing both Pb and Bi, the total content of Pb and Bi is equal to or more than 1 ppm.

Thus, a certain amount of at least one of Pb and Bi remains even after manufacturing the Ni ball 20, and therefore, the measurement error for the content rarely occurs. Furthermore, as mentioned above, Bi and Pb become the crystal cores at the time of melting in the manufacturing step of the Ni ball 20, and therefore, it is possible to manufacture the Ni ball 20 having the high sphericity if a fixed amount of either Bi or Pb is contained in Ni. Accordingly, Pb and Bi are important elements in order to estimate the content of the impurity elements. From this perspective, a total content of at least one of Pb or Bi is preferably equal to or more than 1 ppm. The total content of at least one of Pb and Bi is more preferably equal to or more than 10 ppm. Although an upper limit value is not limited: In terms of suppressing the degradation of the electrical conductivity of the Ni ball 20, the total content of at least one of Pb and Bi is more preferably less than 1000 ppm, and far more preferably 100 ppm or less. The content of Pb is more preferably 10 ppm-50 ppm, and the content of Bi is more preferably 10 ppm-50 ppm.

<Sphericity of Ni Ball: Equal to or Higher than 0.90>

For the Ni ball 20 constituting the present invention, the sphericity is equal to or higher than 0.90, in terms of maintaining an appropriate space between the substrates. If the sphericity of the Ni ball 20 is less than 0.90, the Ni ball 20 becomes an indeterminate shape. Therefore, bumps having uneven heights are formed at the bump formation time and the possibility that poor joints occur is increased. Moreover, when the Ni ball 20 is mounted on an electrode and a reflow treatment is performed thereon, there may be a position gap of the Ni ball 20 and a self-alignment property becomes worse. The sphericity is more preferably equal to or higher than 0.94. In the present invention, the sphericity represents a gap from a true sphere. The sphericity can be determined by various kinds of methods, for example, a least squares center method (LSC method), a minimum zone center method (MZC method), a maximum inscribed center method (MIC method), a minimum circumscribed center method (MCC method), etc. For details, the sphericity is an arithmetic mean value calculated by dividing a diameter of each of 500 Ni balls by a length of the longest axis of each Ni ball. It is shown that when a value thereof is closer to the upper limit 1.00, this is closer to the true sphere. In this invention, the length of the diameter and the length of the longest axis is referred to as lengths measured by measuring equipment, ultra-quick vision, ULTRA QV 350-PRO manufactured by Mitsutoyo Corporation.

<Diameter of Ni Ball: 1-1000 μm>

A diameter of the Ni ball 20 constituting the present invention is preferably 1-1000 μm. If the diameter is within this range, the spherical Ni ball 20 can be stably manufactured. Moreover, a shorted connection can be suppressed when a pitch between the terminals is narrow. In a case that the Ni ball 20 is used for solder paste, the diameter of the Ni ball 20 is preferably 1-300 μm.

Here, for example, if the diameter of the Ni ball 20 according to the present invention is 1-300 μm, a collection of 'Ni balls' can be called as 'Ni powder'. The 'Ni powder' is the collection of many Ni balls 20 having the property as mentioned above. It is distinguished from a single Ni ball 20 in usage form, such as it is mixed as the powder in solder paste, for example. Similarly, in a case that it is used for forming a solder bump, it is usually treated as a collection, and therefore the 'Ni powder' used in such a form is distinguished from the single Ni ball 20.

Moreover, a Ni core ball including the Ni ball 20 and a metal layer can be configured by coating a surface of the Ni ball 20 with the metal layer composed of a single metal or an alloy. For example, the Ni core ball can be configured to be the Ni ball 20 and a solder layer (the metal layer) coating the surface of the Ni ball 20. In case of the alloy, a composition of the solder layer is not specifically limited, if it is an alloy composition of the solder alloy whose main component is Sn. Additionally, the solder layer may be a Sn plating film. For example, Sn, Sn—Ag alloy, Sn—Cu alloy, Sn—Ag—Cu alloy, Sn—In alloy and an alloy in which a predetermined alloy element is added to them are exemplified. In any cases, a content of Sn is equal to or greater than 40 mass %. Moreover, if the alpha dose is not specified, Sn—Bi alloy or Sn—Pb alloy can be also used as a solder layer. The added alloy element may be, for example, Ag, Cu, In, Ni, Co, Sb, Ge, P, Fe, etc. An alloy composition of the solder layer is preferably Sn-3Ag-0.5 Cu alloy among them, in terms of a drop impact characteristic. A thickness of the solder layer is not specifically limited: It is preferably equal to or less than 100 μm at each side thereof, which is sufficient. Generally, 20-50 μm at each side of the layer may be preferable.

The content of each U and Th in the solder layer is equal to or less than 5 ppb in order to make the alpha dose of the Ni core ball equal to or less than 0.0200 cph/cm$^2$. In addition, from a viewpoint of the suppression of the soft error for the current or future high-density mounting, the content of each U and Th is preferably equal to or less than 2 ppb. In addition, the Ni core ball may be configured to be the Ni ball 20 and a plating layer (the metal layer) including at least one element selected from a group of Ni, Fe and Co which coats this Ni ball 20. The film thickness of the plating layer (the metal layer) is generally 0.1-20 μm at each side of the layer. In addition, a strike plating treatment may be performed on the Ni ball according to the present invention by previously using hydrochloric acid nickel solution and the like when the Ni ball is used for a Ni core ball. The strike plating treatment removes an oxide film on the surface of Ni, and adhesiveness between the Ni ball and solder plating can be improved at the time of manufacturing the Ni core ball. Furthermore, a flux layer may be coated on a surface of the Ni core ball.

In addition, a flux layer may be coated on a surface of the Ni ball 20 according to the present invention. Dispersing the Ni balls 20 according to the present invention into solder allows foamed solder to be made. This also allows solder paste including the Ni balls 20 according to the present invention to be made. The Ni ball 20 according to the present invention can be also used for forming a solder joint between electrodes.

The above-mentioned flux layer is composed of one kind or plural kinds of components, containing a compound which works as an activator to remove a metal oxide film at the time of soldering, as well as preventing an oxidation of a metal surface of the Ni ball 20, the solder layer or the like. For example, the flux layer may be configured to be a plurality of components including a compound working as an activator, a compound working as an auxiliary activator and the like. In addition, the flux layer may contain rosin or resin, in order to protect compound and the like working as the activator from the heat at the time of reflow treatment. In addition, the flux layer may contain resin to bind compound and the like working as the activator to the Ni ball 20.

As an activator composing the flux layer, any one of an amine, an organic acid and a halogen, a combination of a plurality of amines, a combination of a plurality of organic acids, a combination of a plurality of halogens, a combination of a single amine, a single organic acid and a single halogen or a combination of plural amines, organic acids and halogens is added depending on the property required in the present invention. As an auxiliary activator composing the flux layer, as above-mentioned, any one of an ester, an amide, an amino acid, a combination of a plurality of esters, a combination of a plurality of amides, a combination of a plurality of amino acids, a combination of a single ester, a single amide and a single amino acid or a combination of plural esters, amides and amino acids is added depending on the property of an activator.

As an auxiliary activator composing the flux layer, any one of an ester, an amide, an amino acid, a combination of a plurality of esters, a combination of a plurality of amides, a combination of a plurality of amino acids, a combination of a single ester, a single amide and a single amino acid or a combination of plural esters, amides and amino acids is added depending on the property of an activator.

In addition, the flux layer may contain rosin or resin, in order to protect compound and the like working as the activator from the heat at the time of reflow treatment. In addition, the flux layer may contain resin to bind compound and the like working as the activator to the solder layer.

The flux layer may be composed of a single layer containing a single compound or plural compounds. In addition, the flux layer may be composed of plural layers comprising plural compounds. The components composing the flux layer adhere to the surface of the solder layer in a solid state thereof, however, the flux needs to be liquefied or gasified in a step of binding the flux to the solder layer.

Therefore, the components composing the flux layer need to be solvent-soluble for the coating with solution. However, in case of forming a salt, for example, insoluble components exist in a solvent. The insoluble elements exist in liquid flux causes so that evenly adsorption thereof becomes difficult, in the flux containing low soluble components which cause forming depositions and the like. For this reason, the liquid flux cannot be composed by being mixed with a salt-forming compound in the prior art.

Whereas, in the Ni core ball having a flux layer in the present invention, a flux multilayer may be formed by forming flux layers one by one and making them into a solid state thereof. Thus, even in a case that a salt-forming compound is used and the component cannot be mixed with the liquid flux, the flux layer can be formed.

By coating the surface of the Ni core ball, which is easy to oxidize, with the flux layer working as the activator, it is possible to inhibit oxidation of the surface of the solder layer of the Ni core ball during storage.

The following will describe an example of a method of manufacturing the Ni ball 20 according to this invention. The atomizing method in the present invention is referred to as a method in which Ni material is melted with high temperature and liquid molten Ni is sprayed from a nozzle at high speed; and therefore, misty molten Ni is rapidly cooled to a room temperature (25 degrees C., for example), and then Ni ball is sphered. The case of using gas as a medium when the liquid molten Ni is sprayed from the nozzle at high speed is referred to as a gas atomizing method. However, the present invention is not limited to such a gas atomizing method.

Additionally, as another atomizing method, a method may be done in which droplet of molten Ni is dropped down from an orifice and then the droplet is cooled rapidly so that a Ni ball is sphered. The Ni ball manufactured in each of the atomizing methods may be reheated at 800 through 1000 degrees C. for 30 through 60 minutes. In addition, the effect of the annealing treatment can be obtained by cooling the Ni ball 20 slowly in the reheating treatment.

For the method of manufacturing the Ni ball 20 in the present invention, the Ni material as a raw material of the Ni ball 20 may be heated at 800 through 1000 degrees C. before the Ni ball 20 is sphered.

As the Ni material that is a raw material of the Ni ball 20, for example, pellet, wire, plate material or the like can be used. The Ni material may have purity of 99.9%-99.995% from a viewpoint such that the purity in the Ni ball 20 is not too low.

In a case of using a Ni material having the further high purity, the heating treatment mentioned above is not performed and a retention temperature of the fused Ni may be lowered to approximately 1000 degrees C. as in a conventional way. Thus, the above-mentioned heating treatment may be omitted or changed according to the alpha dose or the purity in the Ni material. In addition, in a case that a Ni ball 20 having a high alpha dose or a deformed Ni ball 20 is manufactured, the Ni ball 20 is available for reuse as raw materials and furthermore the alpha dose can be decreased.

In this embodiment, an annealing treatment is performed on the sphered Ni ball 20 in order to lower the Vickers Hardness of the Ni ball 20. In the annealing treatment, the Ni ball 20 is heated at an annealing-available temperature of 700 degrees C. for the predetermined time and then the heated Ni ball 20 is slowly cooled in long hours. Accordingly, a recrystallization of the Ni ball 20 is available. A moderate crystal growth can be expedited and therefore the crystal grain of Ni can grow up greatly. In this case, generally the sphericity of Ni becomes lower. However, since the copper oxide formed on the outermost surface of the Ni ball 20 works as an impurity element having a high purity, the crystal grains on the outermost surface of the Ni ball 20 become locally refined and the extreme degradation of sphericity of Ni ball 20 does not occur.

EXECUTED EXAMPLE 1

The following will describe executed examples of the invention, but the invention is not limited thereto. In the executed examples, a Ni ball having high purity is manufactured and the Vickers hardness and the alpha dose of the manufactured Ni ball were measured.

<Manufacture of Ni Ball>

Manufacturing conditions of the Ni ball having the high sphericity were examined. Ni wire having purity of 99.9%

(alpha dose: 0.0034 cph/cm², content of U: 0.7 ppb, content of Th: 0.5 ppb), and Ni wire having purity of 99.995% or less (alpha dose: 0.0026 cph/cm², content of U: <0.5 ppb, content of Th: <0.5 ppb) were prepared. Each of them was put into a melting pot and a preheating treatment was conducted with the temperature condition of 1000 degrees C. for 45 minutes. After that, discharge temperature was set to be 1600 degrees C., and preferably 1700 degrees C., and by a gas atomizing method, liquid molten Ni was sprayed from a nozzle at high speed, and misty melted Ni was rapidly cooled to a room temperature (18 degrees C.), and then the Ni ball was sphered. Thus, the Ni balls each having a mean diameter of 250 μm were manufactured. Inductively-coupled Plasma Source Mass Spectrometry (ICP-MS analysis) was used for the element analysis of U and Th, and Inductively-coupled Plasma Emission Spectroanalysis (ICP-AES analysis) was used for that of the other elements. The following will describe each method of measuring the sphericity, the Vickers hardness and the alpha dose more in detail.

<Sphericity>

The sphericity was measured by CNC image measurement system. Equipment therefor was the ultra quick vision, ULTRA QV350-PRO manufactured by MITSUTOYO Corporation.

<Vickers Hardness>

The Vickers hardness of the Ni ball was measured in accordance with 'Vickers Hardness test—Test method JIS Z2244'. Equipment therefor was micro Vickers hardness testing machine, AKASHI micro hardness tester MVK-F 12001-Q manufactured by AKASHI Corporation.

<Alpha Dose>

A measurement method of the alpha dose is as follows. An alpha-ray measurement instrument of a gas-flow proportional counter was used to measure the alpha dose. A measurement sample was a 300 mm×300 mm flat shallow container with the Ni balls being bedded on a bottom thereof so as not to see the bottom. This measurement sample was put in the alpha-ray measurement instrument and was remained in an atmosphere of PR-10 gas flow for 24 hours, and then the alpha dose was measured.

In addition, the PR-10 gas (argon 90% and methane 10%) used for the measurement was one that a gas bottle filled with the PR-10 gas was kept for a period equal to or longer than three weeks. A reason why using the gas bottle kept for the period equal to or longer than three weeks is based on JESD221 of JEDEC STANDARD-Alpha Radiation Measurement in Electronic Materials determined by JEDEC (Joint Electron Device Engineering Council) so as not to produce the alpha-ray by radon in the atmospheric air that enters into the gas bottle. A table 1 shows the element analysis result, sphericity, Vickers hardness, and alpha dose of the manufactured Ni ball.

TABLE 1

| | ALLOY COMPOSITION | | | | | | | | | | | | | | | | | |
|---|---|---|---|---|---|---|---|---|---|---|---|---|---|---|---|---|---|---|
| | Ni | Sb | Cu | Bi | Zn | Fe | Al | As | Cd | Sn | Pb | Ag | In | Au | P | S | Mg | Ti |
| Ni ball using Ni wire having the purity of 99.9% | Bal. | 18 | 23 | 71 | 2 | 39 | 0 | 58 | 2 | 63 | 67 | 49 | 18 | 2 | 2 | 19 | 0 | 5 |
| Ni ball using Ni wire having the purity of 99.995% or less | Bal. | 12 | 0 | 0 | 0 | 0 | 0 | 27 | 2 | 0 | 0 | 11 | 0 | 0 | 2 | 8 | 0 | 0 |
| Ni ball using Ni plate having the purity exceeding 99.995% | Bal. | 4 | 0 | 0 | 0 | 0 | 0 | 6 | 0 | 0 | 0 | 0 | 0 | 0 | 2 | 6 | 0 | 0 |

| | ALLOY COMPOSITION | | | | | VICKERS | | |
|---|---|---|---|---|---|---|---|---|
| | Co | Mn | U | Th | Total amount of impurity | SPHERICITY | HARDNESS (HV) | αDOSE (cph/cm³) |
| Ni ball using Ni wire having the purity of 99.9% | 61 | 13 | 0.7 | 0.5 | 512 | 0.9460 | 94.4 | <0.0010 |
| Ni ball using Ni wire having the purity of 99.995% or less | 12 | 0 | <0.5 | <0.5 | 74 | 0.9426 | 91.7 | <0.0010 |
| Ni ball using Ni plate having the purity exceeding 99.995% | 7 | 0 | <0.5 | <0.5 | 25 | 0.8792 | 78.8 | <0.0010 |

Element analysis of U and Th: ICP-MS. Others: ICP-AES.
For the unit of Element Analysis of Alloy composition, U and Th are represented by mass ppb. Other elements and Total amount of impurity are represented by mass ppm.

As shown in the Table 1, both of the Ni balls using the Ni wire having the purity of 99.9% and the Ni wire having the purity of 99.995% or less showed sphericity of 0.90 or more, however, the Vickers hardness exceeded 90HV. Moreover, as shown in the Table 1, regarding the Ni balls using the Ni plate having the purity exceeding 99.995% showed the Vickers hardness of 90HV or less, but the sphericity was less than 0.90. Accordingly, it has been proved that the Ni balls shown in the Table 1 cannot meet both of the criteria of sphericity of 0.90 or more and the Vickers hardness of 90HV or less required to the Ni ball according to the present invention.

EXECUTED EXAMPLE 1

Next, the Ni ball manufactured from the Ni wire having the purity of 99.9% was put in a steel tray made of carbon and then the annealing treatment was performed by putting the steel tray into a continuous conveyor type electrical resistance furnace. Annealing conditions for this case are shown in FIG. 2. In addition, nitrogen gas atmosphere was created in the furnace in order to prevent the oxidation of Ni ball. The room temperature was set at 25 degrees C.

As the annealing conditions, as shown in FIG. 2, the time period for the temperature rising from a room temperature to 700 degrees C. was set at 60 minutes, the time period for the retention time at a temperature of 700 degrees C. was set at 60 minutes, and the time period for the cooling time from 700 degrees C. to a room temperature was set at 120 minutes. Cooling the inside of the furnace was performed by the use of a cooling fan installed inside thereof. Subsequently, an acid treatment was performed by soaking the annealed Ni ball into hydrochloric acid of 10%. This is because an oxide film formed on the surface of the Ni ball is removed by the annealing treatment.

The Vickers hardness of each of the Ni balls thus obtained at the pre- and post-annealing treatments will be shown in the Table 2 below. Moreover, the sphericity and alpha dose of the Ni balls at the post-annealing treatment were measured respectively by the above-mentioned method. These measurement results will be also shown in the Table 2 below.

EXECUTED EXAMPLE 2

In the executed example 2, the annealing treatment was performed on the Ni ball manufactured from the Ni wire having the purity of 99.995% or less shown in the Table 1 by the same method as the executed example 1, and a removal treatment of oxide film was conducted. And then the Vickers hardness of the obtained Ni ball was measured. In addition, the sphericity and alpha dose of the Ni ball at the post-annealing treatment were measured respectively by the above-mentioned method. These measurement results will be shown in the Table 2 below.

COMPARISON EXAMPLE 1

In the comparison example 1, the Vickers hardness of the Ni ball manufactured from the Ni wire having the purity of 99.9% shown in the Table 1 was measured. In addition, the sphericity and alpha dose of this Ni ball were measured respectively by the above-mentioned method. These measurement results will be shown in the Table 2 below.

COMPARISON EXAMPLE 2

In the comparison example 2, the Vickers hardness of the Ni ball manufactured from the Ni wire having the purity of 99.995% or less shown in the Table 1 was measured. In addition, the sphericity and alpha dose of this Ni ball were measured respectively by the above-mentioned method. These measurement results will be shown in the Table 2 below.

COMPARISON EXAMPLE 3

In the comparison example 3, the Vickers hardness of the Ni ball manufactured from the Ni plate having the purity exceeding 99.995% shown in the Table 1 was measured. In addition, the sphericity and alpha dose of this Ni ball were measured respectively by the above-mentioned method. These measurement results will be shown in the Table 2 below.

The Vickers hardness of each of the Ni balls in the executed examples 1 and 2 was equal to or higher than 20HV and equal to or less than 90HV by the annealing treatment as shown in the Table 2. In addition, the sphericity of the Ni ball was still kept to be equal to or higher than 0.90 after the annealing treatment. It was expected that the grain growth occurred by the annealing treatment and therefore the sphericity was deteriorated. However, the result was that unexpectedly high sphericity was maintained, according to the executed examples.

As the reason for this, it is conceivable that a lot of impurity elements are contained, or the nickel oxide works as an impurity element at the periphery of the oxide film on the surface of Ni ball so that the degradation of sphericity is inhibited by locally impeding the grain growth at the vicinity of the surface of Ni ball, and the like. Consequently it has been proved that the Ni ball can be obtained of which the Vickers hardness is equal to or higher than 20HV and equal to or less than 90HV, and the sphericity is equal to or higher than 0.90, with the annealing treatment, even in a case where the Ni ball having the purity which is equal to or higher than 99.9 and equal to or lower than 99.995% is used and the Vickers hardness exceeds 90HV at the time of sphering it.

Additionally, in the executed examples 1 and 2, the alpha dose of the Ni ball is equal to or less 0.0010 cph/cm² at the pre- and post-annealing treatment, as shown in the Table 2, and it has been proved that the low alpha dose can be also obtained after the annealing treatment.

Whereas, for the Ni balls in the comparison examples 1 and 2, as shown in the Table 2, its sphericity is equal to or higher than 0.90, but the Vickers hardness exceeds 90HV. Therefore, it has been proved that they do not meet the requirements of both the Vickers hardness and sphericity of Ni ball according to the present invention. Moreover, for the Ni ball in the comparison example 3, the Vickers hardness is equal to or less than 90HV, but the sphericity is less than 0.90. Therefore, it has been proved that such a Ni ball does not meet the requirements of both the Vickers hardness and sphericity of Ni ball according to the present invention.

EXECUTED EXAMPLE 3

The sphericity and alpha dose of the Ni core ball by using the above-mentioned Ni ball will be described at the pre- and post-annealing treatments. In the executed example 3, the sphericity and alpha dose of the Ni core ball were measured by the above-mentioned method. The Ni core ball had been manufactured by coating 1 µm-thick Ni plating layer at each side on the surface of the Ni ball after the annealing treatment in the executed example 1. These measurement results will be shown in the Table 3 below.

TABLE 2

| | PURITY | VICKERS HARDNESS (HV) | SPHERICITY | α DOSE (cph/cm²) | REMARKS |
|---|---|---|---|---|---|
| EXECUTED EXAMPLE 1 | 99.90% | 84.1 | 0.9325 | <0.0010 | Post-annealing treatment |
| EXECUTED EXAMPLE 2 | 99.995% or less | 82.7 | 0.9299 | <0.0010 | Post-annealing treatment |
| COMPARISON EXAMPLE 1 | 99.90% | 94.4 | 0.9480 | <0.0010 | Pre-annealing treatment |
| COMPARISON EXAMPLE 2 | 99.995% or less | 91.7 | 0.9403 | <0.0010 | Pre-annealing treatment |
| COMPARISON EXAMPLE 3 | exceeding 99.995% | 78.8 | 0.8792 | <0.0010 | Pre-annealing treatment |

EXECUTED EXAMPLE 4

In the executed example 4, the sphericity and alpha dose of the Ni core ball were measured by the above-mentioned method. The Ni core ball had been manufactured by coating 1 μm-thick Ni plating layer at each side on the surface of the Ni ball, after the annealing treatment in the executed example 2. These measurement results will be shown in the Table 3 below.

EXECUTED EXAMPLE 5

In the executed example 5, the sphericity and alpha dose of the Ni core ball were measured by the above-mentioned method. The Ni core ball had been manufactured by coating 20 μm-thick solder plating layer of Sn-3Ag-0.5Cu alloy at each side on the surface of the Ni ball, after the annealing treatment in the executed example 1. These measurement results will be shown in the Table 3 below.

EXECUTED EXAMPLE 6

In the executed example 6, the sphericity and alpha dose of the Ni core ball were measured by the above-mentioned method. The Ni core ball had been manufactured by coating 20 μm-thick solder plating layer of Sn-3Ag-0.5Cu alloy at each side on the surface of the Ni ball, after the annealing treatment in the executed example 2. These measurement results will be shown in the Table 3 below.

EXECUTED EXAMPLE 7

In the executed example 7, the sphericity and alpha dose of the Ni core ball were measured by the above-mentioned method. The Ni core ball had been manufactured by further coating the solder plating layer on the surface of the Ni core ball coated with Ni plating in the executed example 3. In the executed example 7, the Ni ball whose diameter is 250 μm, is coated with 1 μm-thick Ni plating layer and 20 μm-thick solder plating layer thereon at each side of the layers, so that a Ni core ball having a diameter of 292 μm is made. These measurement results will be shown in the Table 3 below.

EXECUTED EXAMPLE 8

In the executed example 8, the sphericity and alpha dose of the Ni core ball were measured by the above-mentioned method. The Ni core ball had been manufactured by further coating the solder plating layer on the surface of the Ni core ball coated with Ni plating in the executed example 4. In the executed example 8, the Ni ball whose diameter is 250 μm, is coated with 1 μm-thick Ni plating layer and 20 μm-thick solder plating layer thereon at each side of the layers, so that the Ni core ball having a diameter of 292 μm is made. These measurement results will be shown in the Table 3 below.

COMPARISON EXAMPLE 4

In the comparison example 4, the sphericity and alpha dose of the Ni core ball were measured by the above-mentioned method. The Ni core ball had been manufactured by coating 1 μm-thick Ni plating layer at each side on the surface of the Ni ball in the comparison example 3. These measurement results will be shown in the Table 3 below.

COMPARISON EXAMPLE 5

In the comparison example 5, the sphericity and alpha dose of the Ni core ball were measured by the above-mentioned method. The Ni core ball had been manufactured by coating 20 μm-thick solder plating layer of Sn-3Ag-0.5Cu alloy at each side on the surface of the Ni ball in the comparison example 3. These measurement results will be shown in the Table 3 below.

COMPARISON EXAMPLE 6

In the comparison example 6, the sphericity and alpha dose of the Ni core ball were measured by the above-mentioned method. The Ni core ball had been manufactured by sequentially coating Ni plating layer and then solder plating layer on the surface of the Ni ball in the comparison example 3. In the comparison example 6, the Ni ball whose diameter is 250 μm, is coated with 1 μm-thick Ni plating layer and 20 μm-thick solder plating layer thereon at each side of the layers, so that the Ni core ball having a diameter of 292 μm is made. These measurement results will be shown in the Table 3 below.

TABLE 3

|  | PLATING | PURITY OF Cu BALL | SPHERICITY | α DOSE (cph/cm$^2$) | REMARKS |
| --- | --- | --- | --- | --- | --- |
| EXECUTED EXAMPLE 3 | Ni PLATING | 99.90% | 0.9327 | <0.0010 | Post-annealing treatment |
| EXECUTED EXAMPLE 4 | Ni PLATING | 99.995% or less | 0.9310 | <0.0010 | Post-annealing treatment |
| EXECUTED EXAMPLE 5 | SOLDER PLATING | 99.90% | 0.9471 | <0.0010 | Post-annealing treatment |
| EXECUTED EXAMPLE 6 | SOLDER PLATING | 99.995% or less | 0.9459 | <0.0010 | Post-annealing treatment |
| EXECUTED EXAMPLE 7 | SOLDER PLATING ON Ni PLATING | 99.90% | 0.9488 | <0.0010 | Post-annealing treatment |
| EXECUTED EXAMPLE 8 | SOLDER PLATING ON Ni PLATING | 99.995% or less | 0.9493 | <0.0010 | Post-annealing treatment |
| COMPARISON EXAMPLE 4 | Ni PLATING | exceeding 99.998% | 0.8801 | <0.0010 | Pre-annealing treatment |
| COMPARISON EXAMPLE 5 | SOLDER PLATING | exceeding 59.985% | 0.8851 | <0.0010 | Pre-annealing treatment |
| COMPARISON EXAMPLE 6 | SOLDER PLATING ON Ni PLATING | exceeding 99.985% | 0.8859 | <0.0010 | Pre-annealing treatment |

For the Ni core balls according to the executed examples 3 through 8, the sphericity was equal to or higher than 0.90 in each executed example as shown in the Table 3, and it has been proved that a high sphericity can be obtained even in a case that the Ni ball is coated with Ni plating layer, a solder plating layer, or the piled layers thereof. Similarly, for the Ni core balls according to the executed examples 3 through 8, the alpha dose was equal to or less than 0.0010 cph/cm² in each executed example, and it has been proved that low alpha dose can be kept even in a case that the Ni ball is coated with Ni plating layer, a solder plating layer, or the piled layers thereof.

Whereas, for the comparison examples 4 through 6, the alpha dose was equal to or less than 0.0010 cph/cm² in each comparison example, which meets the requirement of the alpha dose of the Ni core ball according to the present invention. However, the sphericity was less than 0.90 and it has been proved that they do not meet the requirement of the sphericity of the Ni core ball according to the present invention.

Furthermore, a flux layer was coated on surface of each of the Ni balls in the executed example 1 and 2, and each of the Ni core balls in the executed example 3 through 8, and then the alpha dose was measured. Although not specified on the Table 2 and the Table 3 above, alpha dose in each of the executed examples is 0.0010 cph/cm² or less, which meets a requirement, in which the alpha dose of the Cu ball according to the present invention is equal to or less than a value, 0.0200 cph/cm² that is preferable for inhibiting a soft error.

In addition, technical scope of the present invention is applicable for a Ni column, a pillar and a pellet which hold the above-mentioned characteristics of the present invention.

DESCRIPTION OF CODES

10 Semiconductor Chip
11, 41 Electrode
12, 42 Solder Paste
20 Solder Ball
30 Solder Bump
40 Printed Circuit Board
50 Solder Joint
60 Electronic Components

The invention claimed is:

1. A Ni ball, containing:
   purity which is equal to or higher than 99.9% by mass and equal to or lower than 99.995% by mass,
   sphericity which is equal to or higher than 0.90, and
   Vickers hardness which is equal to or higher than 20HV and equal to or less than 90HV.

2. The Ni ball according to claim 1, wherein
   a content of U is equal to or less than 5 ppb;
   a content of Th is equal to or less than 5 ppb;
   a total content of at least one of Pb and Bi is equal to or more than 1 ppm; and
   an alpha dose is equal to or less than 0.0200 cph/cm².

3. The Ni ball according to claim 1, wherein a diameter thereof is 1-1000 μm.

4. The Ni ball according to claim 1, wherein the Ni ball is coated with a flux layer.

5. A Ni core ball, containing:
   the Ni ball according to claim 1; and
   a solder layer coating the Ni ball.

6. A Ni core ball, containing:
   the Ni ball according to claim 1; and
   a plating layer which includes at least one element selected from a group of Ni, Fe and Co, the plating layer coating the Ni ball.

7. The Ni core ball according to claim 6, further comprising: a solder layer which coats the plating layer.

8. The Ni core ball according to claim 5, wherein sphericity thereof is equal to or higher than 0.90.

9. The Ni core ball according to claim 7, wherein in the solder layer coating the plating layer,
   an alpha dose is equal to or less than 0.0200 cph/cm².

10. The Ni core ball according to claim 5 wherein the Ni core ball is coated with a flux layer.

11. A solder joint using the Ni ball according to claim 1.

12. Solder paste using the Ni ball according to claim 1.

13. Foamed solder using the Ni ball according to claim 1.

14. A solder joint using the Ni core ball according to claim 5.

15. Solder paste using the Ni core ball according to claim 5.

16. Foamed solder using the Ni core ball according to claim 5.

* * * * *